United States Patent [19]

Uzawa et al.

[11] Patent Number: 4,998,807
[45] Date of Patent: Mar. 12, 1991

[54] VARIABLE FOCAL LENGTH LENS SYSTEM

[75] Inventors: Tsutomu Uzawa; Atsujiro Ishii; Norihiko Aoki, all of Tokyo, Japan

[73] Assignee: Olympus Optical Co. Ltd., Tokyo, Japan

[21] Appl. No.: 397,247

[22] Filed: Aug. 23, 1989

[30] Foreign Application Priority Data

Aug. 23, 1988 [JP] Japan .................................. 63-207290

[51] Int. Cl.$^5$ ............................................. G02B 15/14
[52] U.S. Cl. ..................................... 350/423; 350/413; 350/450
[58] Field of Search ................. 350/423, 427, 413, 450

[56] References Cited

U.S. PATENT DOCUMENTS 4,571,032 2/1986 Someya et al. ................... 350/423 X
4,730,906 3/1988 Okudaira ............................. 350/426
4,806,079 6/1990 Mihara et al. ....................... 350/427

FOREIGN PATENT DOCUMENTS 61-249015 11/1986 Japan .
61-249016 11/1986 Japan .
62-173420 7/1987 Japan .................................. 350/413

Primary Examiner—Scott J. Sugarman
Attorney, Agent, or Firm—Cushman, Darby & Cushman

[57] ABSTRACT

A variable focal length lens system comprising a plurality of lens units, arranged with an imaging lens unit with a positive refractive power being located at the image side, and at least one lens unit being movable to change an airspace for varying focal length. The positive lens unit for image formation is made of at least one radial GRIN lens, arranged to distribute a stop at the object side of said lens unit. By utilizing a lesser numbers of lenses, it is possible for this vari-focal lens to have simpler processing, assembly, and adjustment of lenses and lens burrels with an efficient performance.

9 Claims, 12 Drawing Sheets

VARIABLE FOCAL LENGTH LENS SYSTEM

BACKGROUND OF THE INVENTION (a) Field of the Invention

The present invention relates to a variable focal length lens system and, more particularly, to a variable focal length lens system utilizing fewer numbers of lenses.

(b) Description of the Prior Art

Formerly a variable focal length lens system with a comparatively large vari-focal ratio has been widely used especially for a video-camera lens. It generally comprises first lens unit having a positive refractive power, second lens unit having a negative refractive power and a function to vary focal length of the lens system, third lens unit having either positive or negative refractive power and a function to keep a certain distance from the image surface at the time of changing a focal length, and fourth lens unit having a positive refractive power and a capacity of image formation.

Moreover, as a variable focal length lens system with a comparatively small vari-focal ratio, it comprises first lens unit having a negative refractive power, and second lens unit having a positive refractive power, and, as is well known, a lens system which changes a focal length by moving an airspace between above two lens units. This variable focal length lens system has a function of image formation in the second lens unit.

In these known vari-focal lens systems, the lens unit having the function of image formation which is located on the most image side among lens units (hereinafter, the lens unit is referred to as an "imaging lens unit") contains the largest number of lenses among these varifocal lens systems.

Besides, as the refractive power of each lens of the imaging lens unit is strong, it is time-consuming for processing lenses and lens burrels and assembling them, and therefore the manufacturing cost of the imaging lens unit will be high.

In order to reduce the number of lenses of this imaging lens unit, a spherical homogeneous lens has its own limit in case composing of this lens system. For this reason, an aspherical lens is utilized or a graded refractive index lens (GRIN lens) is hitherto known to be used.

A radial GRIN lens, whose refractive index is varied from the optical axis to the environs of the lens, i.e. in the direction of radius, has an especially good correction of aberrations. Therefore, it can be possible to reduce the number of lenses, to make a compact lens system and to minimize in cost if it can be well exploited.

Lens system disclosed, for example, in Japanese published unexamined patent applications Nos. 61-249015 and 61-249016 are known as the above-mentioned variable focal length lens system, particularly imaging lens unit whose number of lenses is reduced by using GRIN lenses.

Among these former vari-focal lens systems, the former comprises two lens units, one negative and the other positive, and a positive imaging lens unit applies a radial GRIN lens to reduce a number of lenses. The latter is arranged so as to locate an imaging lens unit close to the image side by utilizing a radial GRIN lens to reduce the number of lenses.

SUMMARY OF THE INVENTION

It is a primary object of the present invention to adopt GRIN lenses for an imaging lens unit situated close to the image side, and to prompt greater reduction in the number of lenses from this lens unit, and ultimately to provide a variable focal length lens system which is simpler to process and assemble.

The vari-focal lens system of the present invention contains the imaging lens unit that has a positive refractive power, and that is located on the most image side among lens units. The imaging lens unit maybe composed of only one radial GRIN lens which can carry out not only image formation but also aberration correction.

Furthermore, the variable focal length lens according to the present invention consists of a plurality of lens units, and at least one airspace among the lens units is movable to change a focal length. The stop is arranged so as to be located at the object side of the imaging lens unit, which is the closest location to the image side.

This imaging lens unit can also adopt at least one homogeneous lens besides the GRIN lens as mentioned above. In this case, the following to condition need to be satisfied.

$$f_G \cdot \sum_i |1/f_i| < 0.4 \quad (1)$$

where reference symbol $f_G$ represents the focal length of the GRIN lens in the imaging lens unit, and reference symbol $f_i$ represents the focal length of the i-th lens of the homogeneous lens in the imaging lens unit.

In the case of a vari-focal lens system like the above lens configurations, if such an imaging lens unit is arranged so as to be located close to the image side comprises a larger number of lenses, the aperture stop of the lens system can be considered to dispose within the lens unit.

However, if such a lens unit comprises a fewer number of lenses, it is preferable to locate a stop at the object side of the lens unit in terms of performing a good correction of aberrations and also shortening a lens diameter. In case of lens system for cameras, utilizing an electric image pickup device such as videocamera, it is desirable to adopt a telecentric lens configuration at the image side. For to the above reason, it is necessary for an imaging lens unit having a positive refractive power to be placed closer to the image side than a stop.

After satisfying all these requirements, the imaging lens unit itself should eliminate various aberrations and at the same time residual aberrations produced by other lens unit located at the object side need to be corrected so that an accurate or clearer image can be obtainable.

Such corrections of aberrations as above, particularly spherical and chromatic aberrations are therefore quite important.

In the case of correcting spherical aberration, it can be possible by rectifying the appropriate coefficients $n_1(d)$, $n_2(d)$ (reference symbol d represents the value of coefficient of $n_2$ corresponding to d line) in the refractive index distribution of the GRIN lens below expressed by the following formula, and also by properly selecting the thickness "D" of GRIN lens on the optical axis.

$$n(r) = N_0 + N_1 r^2 + N_2 r^4 + \ldots$$

where $n_0$ represents the refractive index on the optical axis, r represents the radial distance from the optical axis, $n_1, n_2, \ldots$ represent the coefficients of the refractive index distribution.

The value $n_1(d)$ mainly concerns correction of aberration on the lens surface and if $n_1(d)$ is negative and its absolute value becomes larger, then amounts of aberration corrections get larger. On the other hand, $n_2(d)$ mainly concerns the refractive condition of rays inside the lens and if $n_2(d) \times D$ is positive and its absolute value becomes larger, then amounts of aberration correction get larger.

Furthermore in a lens configuration like this varifocal lens system according to the present invention, the offaxial principal ray tends to pass through lower than the axial marginal ray, hence the influence on the offaxial aberrations by $n_1(d)$ is greater than that of $n_2(d)$.

For this reason, if the correction of the off-axial aberrations such as distortion and curvature of field is rather under-corrected compared to the spherical aberrations, then to keep $n_1(d)$ being negative and its absolute number being larger, and also to keep the value of $n_2(d) \times D$ being smaller, which can thus be possible to correct not only distortion but also curvature of field without cancelling a good correction of spherical aberrations.

Next is the chromatic aberrations and its correction; a good correction is only possible if the Abbe number radius away from the optical axis is made smaller compared to the one on the optical axis of the GRIN lens owing to a varying refractive index distribution produced by wavelength.

As described in detail, so far, only one radial GRIN lens can construct an imaging lens unit and can attain an object of the present invention which is to design a variable focal length lens system. In order to obtain more accurate and complete image formation lens system, especially to correct the offaxial aberrations satisfactorily, it is better to place a homogeneous lens in the imaging lens unit. In this case, it is therefore desirable to fulfill the afore-mentioned condition (1).

Condition (1) shows that primarily GRIN lens takes partial charge of forming image in the imaging lens unit. That is to say, if the condition (1) is not accepted, the homogeneous lens thereof must take a greater charge of refractive power $|1/f_i|$, accordingly a capacity of the lens system tends to be inferior due to a change of airspace between lenses and decentering. Therefore effectiveness of the present invention becomes dim owing to the time-consuming processing, assembling, and adjusting lenses or lens burrels.

The above-mentioned variable focal length lens can attain an object of the present invention, however, the GRIN lens is still more desirable to fulfill the following conditions (2) and (3) for the purpose of aberration corrections.

$$-2 < n_1(d) \cdot f_G^2 < 0.5 \quad (2)$$

$$-0.5 < n_2(d) \cdot D \cdot f_G^3 < 2 \quad (3)$$

where reference symbols $n_1(d)$, $n_2(d)$ respectively represent the coefficients of $n_1$, $n_2$ corresponding to the d line and D represents a thickness of the GRIN lens on the optical axis.

These conditions are generally required for correction of spherical aberration in the lens system. Under the above condition (2), if a positive value $n_1(d) \cdot f_G^2$ becomes larger and exceeds the upper limit of 0.5, its spherical aberration correction becomes under-corrected. Whereas, if $n_1(d) f_G^2$ is negative and its absolute value becomes larger and that if it goes down below the lower limit of $-2$ under the above condition (2), then its spherical aberration correction becomes over-corrected.

Furthermore, under the above condition (3), if $N_2(d) \cdot D \cdot f_G^3$ is negative and its absolute value becomes larger so that the value of $n_2(d) \cdot D \cdot f_G^3$ goes down below the lower limit of $-0.5$, then its spherical aberration becomes under-corrected. However, carrying out the correction of the spherical aberration would lead to a larger negative value of $n_1(d) f_G^2$, whereby the offaxial aberration in the lens system will become over corrected. On the other hand, if a positive value of $n_2(d) \cdot D \cdot f_G^3$ becomes larger and exceeds the upper limit of 2 under the condition (3), it brings about an over-correction of spherical aberration. However, solving the above problems means obtaining a larger positive value of $n_1(d) \cdot D \cdot f_G^2$ so that its offaxial aberration is under-corrected and it, of course, is an unfavorable result. The fact is that even the correction of chromatic aberrations should fulfill the following condition (4).

$$0 < \nu_0 - \nu_r < 30 \quad (4)$$

where reference symbol $\nu_0$ represents the Abbe number of GRIN lens on the optical axis and reference symbol $\nu_r$ represents the Abbe number of the closest marginal area of GRIN lens.

If it goes down below the lower limit of the above condition (4), the correction of chromatic aberration is not achieved. If it exceeds the upper limit, this leads to the over-correction of chromatic aberration.

The imaging lens unit, applying GRIN lens, according to the present invention is utilizing rather thick lens in order to achieve a good correction of spherical aberration and other residual aberrations. It is therefore necessary for the GRIN lens' thickness "D" to satisfy the condition (5) shown below.

$$0.4 < D/f_G < 2.5 \quad (5)$$

If $D/f_G$ goes down below the lower limit of 0.5, then spherical and other various aberrations as well become under-corrected. Whilst if it exceeds the upper limit of 2.5, it is difficult to maintain the back focal length of this lens system at a desired distance, thus it is also difficult to place a beam splitter to branch optical path into finder system or to place an optical filter. Furthermore, the whole length of lens system becomes longer. These are unfavourable.

DETAILED DESCRIPTION OF THE PREFERRED EMBODIMENTS

Figure 1:
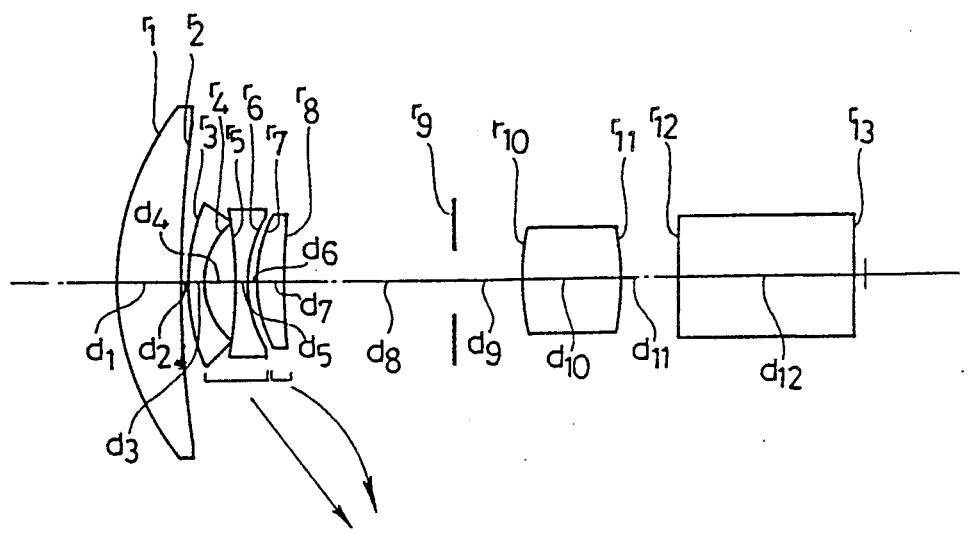
FIG. 1 through 6, respectively, show variable focal length lens system according to the present invention and also show a sectional view of Embodiments 1, 2, 3, 4, 5, and 6.
Figure 2:
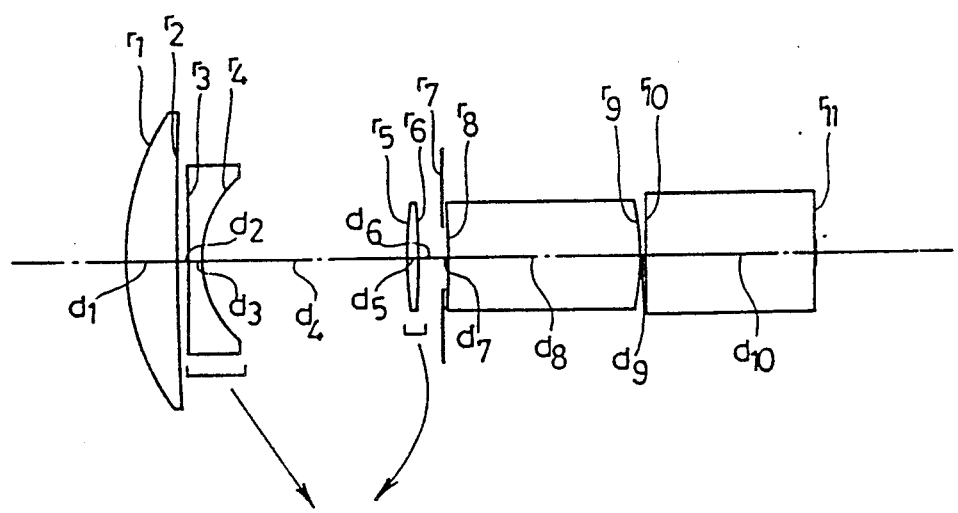

Preferred Embodiments of the variable focal length lens system according to the present invention are explained below.

EMBODIMENT 1

| $f = 9.5-27$, $2\omega = 45.6°-16.8°$ | | | |
|---|---|---|---|
| $r_1 = 25.4197$ | $d_1 = 5.7977$ | $n_{01} = 1.72000$ | $\nu_1 = 50.24$ |
| $r_2 = 110.3127$ | $d_2 = D_1$ | | |
| $r_3 = 18.5063$ | $d_3 = 1.4264$ | $n_{02} = 1.71300$ | $\nu_2 = 53.84$ |
| $r_4 = 6.9976$ | $d_4 = 2.8241$ | | |
| $r_5 = -38.6029$ | $d_5 = 1.1139$ | $n_{03} = 1.67790$ | $\nu_3 = 55.33$ |
| $r_6 = 11.2240$ | $d_6 = D_2$ | | |
| $r_7 = 11.7632$ | $d_7 = 2.5653$ | $n_{04} = 1.84666$ | $\nu_4 = 23.88$ |
| $r_8 = 60.6966$ | $d_8 = D_3$ | | |
| $r_9 = \infty$ (stop) | $d_9 = 6.0933$ | | |
| $r_{10} = 26.2127$ | $d_{10} = 8.9831$ | $n_{05} = 1.72000$ | $\nu_5 = 41.98$ |
| $r_{11} = -22.5446$ | $d_{11} = 5.1165$ | | |
| $r_{12} = \infty$ | $d_{12} = 16.5000$ | $n_{06} = 1.51633$ | $\nu_6 = 64.15$ |
| $r_{13} = \infty$ | | | |

| f | 9.5 | 16 | 27 |
|---|---|---|---|
| $D_1$ | 0.600 | 8.335 | 14.798 |
| $D_2$ | 0.800 | 1.316 | 0.800 |
| $D_3$ | 15.598 | 7.348 | 1.400 |

| GRIN lens ($n_{01}$) | | |
|---|---|---|
| wavelength | $n_0$ | $n_1$ |
| 587.56 | 1.72000 | $-0.17223 \times 10^{-3}$ |
| 656.28 | 1.71568 | $-0.18571 \times 10^{-3}$ |
| 486.13 | 1.73001 | $-0.14075 \times 10^{-3}$ |

| | $n_2$ |
|---|---|
| 587.56 | $-0.18224 \times 10^{-6}$ |
| 656.28 | $-0.17959 \times 10^{-6}$ |
| 486.13 | $-0.18843 \times 10^{-6}$ |

| GRIN lens ($n_{05}$) | | |
|---|---|---|
| wavelength | $n_0$ | $n_1$ |
| 587.56 | 1.72000 | $-0.10522 \times 10^{-2}$ |
| 656.28 | 1.71492 | $-0.10761 \times 10^{-2}$ |
| 486.13 | 1.73207 | $-0.99627 \times 10^{-3}$ |

| | $n_2$ |
|---|---|
| 587.56 | $0.11291 \times 10^{-5}$ |
| 656.28 | $0.11254 \times 10^{-5}$ |
| 486.13 | $0.11378 \times 10^{-5}$ |

$f_g = 14.168$
$n_1 (d) \cdot f_G^2 = -0.10522 \times 10^{-2} \times 14.168 = -0.21$
$n_2 (d) \cdot D \cdot f_G^3 = 0.11291 \times 10^{-5} \times 8.9831 \times 14.168 = 0.029$
$\nu_0 - \nu_r = 42.0 - 37.6 = 4.4$, $D/f_G = 0.63$

Embodiment 2

| $f = 9.26-26.22$, $2\omega = 46.8°-17.4°$ | | | |
|---|---|---|---|
| $r_1 = 23.4576$ | $d_1 = 4.6812$ | $n_{01} = 1.6299$ | $\nu_1 = 58.17$ |
| $r_2 = 334.5494$ | $d_2 = D_1$ | | |
| $r_3 = -831.9941$ | $d_3 = 1.2065$ | $n_{02} = 1.66755$ | $\nu_2 = 41.91$ |
| $r_4 = 9.0955$ | $d_4 = D_2$ | | |
| $r_5 = 31.1845$ | $d_5 = 1.0000$ | $n_{03} = 1.69680$ | $\nu_3 = 55.52$ |
| $r_6 = -70.1615$ | $d_6 = D_3$ | | |
| $r_7 = \infty$ (stop) | $d_7 = 0.5000$ | | |
| $r_8 = -59.7787$ | $d_8 = 17.3988$ | $n_{04} = 1.64850$ | $\nu_4 = 53.03$ |
| $r_9 = -24.2335$ | $d_9 = 0.5000$ | | |
| $r_{10} = \infty$ | $d_{10} = 15.5000$ | $n_{05} = 1.51633$ | $\nu_5 = 64.15$ |
| $r_{11} = \infty$ | | | |

| f | 9.26 | 15.2 | 26.22 |
|---|---|---|---|
| $D_1$ | 1.000 | 9.122 | 13.695 |
| $D_2$ | 18.763 | 12.744 | 2.470 |

| $f = 9.26-26.22$, $2\omega = 46.8°-17.4°$ | | | |
|---|---|---|---|
| $D_3$ | 2.176 | 0.072 | 5.774 |

| GRIN lens ($n_{01}$) | | |
|---|---|---|
| wavelength | $n_0$ | $n_1$ |
| 587.56 | 1.62299 | $-0.13447 \times 10^{-3}$ |
| 656.28 | 1.61974 | $-0.13329 \times 10^{-3}$ |
| 486.13 | 1.63045 | $-0.13723 \times 10^{-3}$ |

| | $n_2$ |
|---|---|
| 587.56 | $-0.30850 \times 10^{-6}$ |
| 656.28 | $-0.38469 \times 10^{-6}$ |
| 486.13 | $-0.13071 \times 10^{-6}$ |

| GRIN lens ($n_{02}$) | | |
|---|---|---|
| wavelength | $n_0$ | $n_1$ |
| 587.56 | 1.66755 | $-0.28113 \times 10^{-3}$ |
| 656.28 | 1.66284 | $-0.20446 \times 10^{-3}$ |
| 486.13 | 1.67877 | $-0.46003 \times 10^{-3}$ |

| | $n_2$ |
|---|---|
| 587.56 | $-0.41955 \times 10^{-5}$ |
| 656.28 | $-0.50945 \times 10^{-5}$ |
| 486.13 | $-0.20977 \times 10^{-5}$ |

| GRIN lens ($n_{04}$) | | |
|---|---|---|
| wavelength | $n_0$ | $n_1$ |
| 587.56 | 1.64850 | $-0.16207 \times 10^{-2}$ |
| 656.28 | 1.64481 | $-0.16280 \times 10^{-2}$ |
| 486.13 | 1.65704 | $-0.16035 \times 10^{-2}$ |

| | $n_2$ |
|---|---|
| 587.56 | $0.18936 \times 10^{-5}$ |
| 656.28 | $0.18999 \times 10^{-5}$ |
| 486.13 | $0.18789 \times 10^{-5}$ |

$f_G = 15.351$
$n_1 (d) \cdot f_G^2 = -0.16207 \times 10^{-2} \times 15.351^2 = -0.38$
$n_2 (d) \cdot D \cdot f_G^3 = 0.18936 \times 10^{-5} \times 17.3988 \times 15.351^3 = 0.12$
$\nu_0 - \nu_r = 53.0 - 48.6 = 4.4$, $D/f_G = 1.13$

Embodiment 3

| $f = 9.26-26.22$, $2\omega = 46.8°-17.4°$ | | | |
|---|---|---|---|
| $r_1 = 25.3301$ | $d_1 = 4.6034$ | $n_{01} = 1.62299$ | $\nu_1 = 58.17$ |
| $r_2 = -1747.0483$ | $d_2 = D_1$ | | |
| $r_3 = -633.3314$ | $d_3 = 2.4994$ | $n_{02} = 1.68893$ | $\nu_2 = 31.07$ |
| $r_4 = 8.6040$ | $d_4 = D_2$ | | |
| $r_5 = \infty$ (stop) | $d_5 = 4.4127$ | | |
| $r_6 = 30.5022$ | $d_6 = 12.8586$ | $n_{03} = 1.64850$ | $\nu_3 = 53.03$ |
| $r_7 = -19.7329$ | $d_7 = 4.5693$ | | |
| $r_8 = \infty$ | $d_8 = 15.5000$ | $n_{04} = 1.51633$ | $\nu_4 = 64.15$ |
| $r_9 = \infty$ | | | |

| f | 9.26 | 15.20 | 26.22 |
|---|---|---|---|
| $D_1$ | 1.000 | 8.847 | 13.989 |
| $D_2$ | 18.069 | 12.965 | 3.496 |

| GRIN lens ($n_{01}$) | | |
|---|---|---|
| wavelength | $n_0$ | $n_1$ |
| 587.56 | 1.62299 | $-0.16255 \times 10^{-3}$ |
| 656.28 | 1.61974 | $-0.16251 \times 10^{-3}$ |
| 486.13 | 1.63045 | $-0.16263 \times 10^{-3}$ |

| | $n_2$ |
|---|---|
| 587.56 | $-0.70256 \times 10^{-6}$ |
| 656.28 | $-0.89464 \times 10^{-6}$ |
| 486.13 | $-0.25438 \times 10^{-6}$ |

| GRIN lens ($n_{02}$) | | |
|---|---|---|
| wavelength | $n_0$ | $n_1$ |
| 587.56 | 1.68893 | $-0.41074 \times 10^{-3}$ |
| 656.28 | 1.68248 | $-0.32700 \times 10^{-3}$ |
| 486.13 | 1.70465 | $-0.60613 \times 10^{-3}$ |

| | $n_2$ |
|---|---|
| 587.56 | $-0.32200 \times 10^{-6}$ |
| 656.28 | $-0.34670 \times 10^{-6}$ |

-continued

| f = 9.26-26.22, 2ω = 46.8°-17.4° | |
|---|---|
| 486.13 | $-0.26437 \times 10^{-6}$ |

GRIN lens ($n_{03}$)

| wavelength | $n_0$ | $n_1$ |
|---|---|---|
| 587.56 | 1.64850 | $-0.13197 \times 10^{-2}$ |
| 656.28 | 1.64481 | $-0.13273 \times 10^{-2}$ |
| 486.13 | 1.65704 | $-0.13020 \times 10^{-2}$ |

| | $n_2$ |
|---|---|
| 587.56 | $0.45398 \times 10^{-6}$ |
| 656.28 | $0.45397 \times 10^{-6}$ |
| 486.13 | $0.45399 \times 10^{-6}$ |

$f_G = 13.447$
$n_1(d) \cdot f_G^2 = -0.13197 \times 10^{-2} \times 13.447^2 = -0.24$
$n_2(d) \cdot D \cdot f_G^3 = 0.45398 \times 10^{-6} \times 12.8586 \times 13.447^3 = 0.014$
$\nu_0 - \nu_r = 53 - 48.9 = 4.1, D/f_G = 0.96$ Embodiment 4

| f = 8-24, 2ω = 53.2°-19° | | | |
|---|---|---|---|
| $r_1 = -96.1681$ (aspherical surface) | $d_1 = 2.0000$ | $n_{01} = 1.51633$ | $\nu_1 = 64.15$ |
| $r_2 = 8.1766$ | $d_2 = 2.4593$ | | |
| $r_3 = 10.2702$ | $d_3 = 4.4770$ | $n_{02} = 1.67270$ | $\nu_2 = 32.10$ |
| $r_4 = 16.1041$ | $d_4 = D_1$ | | |
| $r_5 = \infty$ (stop) | $d_5 = D_2$ | | |
| $r_6 = 20.2837$ | $d_6 = 14.3773$ | $n_{03} = 1.60311$ | $\nu_3 = 60.68$ |
| $r_7 = -17.2565$ | $d_7 = D_3$ | | |
| $r_8 = \infty$ | $d_8 = 16.5000$ | $n_{04} = 1.51633$ | $\nu_4 = 64.15$ |
| $r_9 = \infty$ | | | | aspherical surface coefficients
$P = 1.0000, E = 0.24363 \times 10^{-4}$
$F = 0.41233 \times 10^{-6}$

| f | 8 | 12 | 24 |
|---|---|---|---|
| $D_1$ | 30.236 | 13.566 | 3.000 |
| $D_2$ | 13.498 | 10.446 | 1.290 |
| $D_3$ | 8.452 | 11.504 | 20.660 |

GRIN lens ($n_{03}$)

| wavelength | $n_0$ | $n_1$ |
|---|---|---|
| 587.56 | 1.60311 | $0.13096 \times 10^{-3}$ |
| 656.28 | 1.60008 | $0.11862 \times 10^{-3}$ |
| 486.13 | 1.61002 | $0.15976 \times 10^{-3}$ |

| | $n_2$ | $n_3$ |
|---|---|---|
| 587.56 | $0.42598 \times 10^{-5}$ | $0.20436 \times 10^{-7}$ |
| 656.28 | $0.42598 \times 10^{-5}$ | $0.20448 \times 10^{-7}$ |
| 486.13 | $0.42598 \times 10^{-5}$ | $0.20407 \times 10^{-7}$ |

$f_G = 19.004$
$n_1(d) \cdot f_G^2 = 0.13096 \times 10^{-3} \times 19.004^2 = 0.047$
$n_2(d) \cdot D \cdot f_G^3 = 0.42598 \times 10^{-5} \times 14.3773 \times 19.004^3 = 0.42$
$\nu_0 - \nu_r = 60.7 - 55.1 = 5.6, D/f_G = 0.76$ Embodiment 5

| f = 9.5-19, 2ω = 45.6°-23.8° | | | |
|---|---|---|---|
| $r_1 = 61.7200$ | $d_1 = 2.0214$ | $n_{01} = 1.60342$ | $\nu_1 = 38.01$ |
| $r_2 = 25.2397$ | $d_2 = D_1$ | | |
| $r_3 = \infty$ (stop) | $d_3 = D_2$ | | |
| $r_4 = 29.7290$ | $d_4 = 13.4425$ | $n_{02} = 1.69700$ | $\nu_2 = 48.51$ |
| $r_5 = -15.2794$ | $d_5 = D_3$ | | |
| $r_6 = \infty$ | $d_6 = 15.5000$ | $n_{03} = 1.51633$ | $\nu_3 = 64.15$ |
| $r_7 = \infty$ | | | |

| f | 9.5 | 12 | 19 |
|---|---|---|---|
| $D_1$ | 26.546 | 15.702 | 2.000 |
| $D_2$ | 4.147 | 3.090 | 0.132 |
| $D_3$ | 4.705 | 5.761 | 8.719 |

GRIN lens ($n_{01}$)

| wavelength | $n_0$ | $n_1$ |
|---|---|---|

-continued

| f = 9.5-19, 2ω = 45.6°-23.8° | | |
|---|---|---|
| 587.56 | 1.60342 | $0.34395 \times 10^{-2}$ |
| 656.28 | 1.59875 | $0.34292 \times 10^{-2}$ |
| 486.13 | 1.61462 | $0.34636 \times 10^{-2}$ |

| | $n_2$ |
|---|---|
| 587.56 | $-0.10439 \times 10^{-4}$ |
| 656.28 | $-0.98184 \times 10^{-5}$ |
| 486.13 | $-0.11887 \times 10^{-4}$ |

GRIN lens ($n_{02}$)

| wavelength | $n_0$ | $n_1$ |
|---|---|---|
| 587.56 | 1.69700 | $-0.27791 \times 10^{-3}$ |
| 656.28 | 1.69268 | $-0.29414 \times 10^{-3}$ |
| 486.13 | 1.70705 | $-0.24005 \times 10^{-3}$ |

| | $n_2$ | $n_3$ |
|---|---|---|
| 587.56 | $0.56526 \times 10^{-5}$ | $-0.62149 \times 10^{-7}$ |
| 656.28 | $0.56705 \times 10^{-5}$ | $-0.61900 \times 10^{-7}$ |
| 486.13 | $0.56108 \times 10^{-5}$ | $-0.62730 \times 10^{-7}$ |

$f_G = 15.143$
$n_1(d) \cdot f_G^2 = -0.27791 \times 10^{-3} \times 15.143^2 = -0.064$
$n_2(d) \cdot D \cdot f_G^3 = 0.56526 \times 10^{-5} \times 13.4425 \times 15.143^3 = 0.26$
$\nu_0 - \nu_r = 48.5 - 44.4 = 4.1, D/f_G = 0.89$ Embodiment 6

| f = 10-30, 2ω = 43.6° - 15.2° | | | |
|---|---|---|---|
| $r_1 = 187.2539$ | $d_1 = 3.5464$ | $n_{01} = 1.53172$ | $\nu_1 = 48.90$ |
| $r_2 = 181.7704$ | $d_2 = D_1$ | | |
| $r_3 = \infty$ (stop) | $d_3 = D_2$ | | |
| $r_4 = 20.4851$ | $d_4 = 14.2578$ | $n_{02} = 1.60311$ | $\nu_2 = 60.68$ |
| $r_5 = -17.5012$ | $d_5 = 1.0407$ | | |
| $r_6 = -33.5196$ | $d_6 = 1.9182$ | $n_{03} = 1.56444$ | $\nu_3 = 43.78$ |
| $r_7 = -221.3527$ | $d_7 = D_3$ | | |
| $r_8 = \infty$ | $d_8 = 15.5000$ | $n_{04} = 1.51633$ | $\nu_4 = 64.15$ |
| $r_9 = \infty$ | | | |

| f | 10 | 17 | 30 |
|---|---|---|---|
| $D_1$ | 23.812 | 6.340 | 1.000 |
| $D_2$ | 13.636 | 9.214 | 1.000 |
| $D_3$ | 5.315 | 9.738 | 17.952 |

GRIN lens ($n_{01}$)

| wavelength | $n_0$ | $n_1$ | $n_2$ |
|---|---|---|---|
| 587.56 | 1.53172 | $0.47873 \times 10^{-2}$ | $-0.53793 \times 10^{-6}$ |
| 656.28 | 1.52845 | $0.47873 \times 10^{-2}$ | $-0.53793 \times 10^{-6}$ |
| 486.13 | 1.53933 | $0.47873 \times 10^{-2}$ | $-0.53793 \times 10^{-6}$ |

GRIN lens ($n_{02}$)

| wavelength | $n_0$ | $n_1$ | $n_2$ |
|---|---|---|---|
| 587.56 | 1.60311 | $-0.42964 \times 10^{-3}$ | $0.25980 \times 10^{-5}$ |
| 656.28 | 1.60008 | $-0.43685 \times 10^{-5}$ | $0.25878 \times 10^{-5}$ |
| 486.13 | 1.61002 | $-0.41283 \times 10^{-3}$ | $0.26217 \times 10^{-5}$ |

$f_G = 15.718$
$n_1(d) \cdot f_G = -0.42964 \times 10^{-3} \times 15.718^2 = -0.11$
$n_2(d) \cdot D \cdot f_G^3 = 0.2598 \times 10^{-5} \times 14.2578 \times 15.718^3 = 0.14$
$\nu_0 - \nu_r = 60.7 - 56.3 = 4.4, D/f_G = 0.91$ $f_i = -70.242, 1/f_i = -0.014, f \cdot \Sigma \left|\frac{1}{f_i}\right| = 0.22$ where reference symbols $r_1, r_2, \ldots$, respectively represent the radii of curvatures of respective lens surfaces, reference symbols $d_1, d_2, \ldots$, respectively represent thickness of respective lenses and airspaces between respective lenses, reference symbols $N_{01}$, $N_{02}$, ..., respectively represent refractive indices of respective lenses, reference symbols $\nu_1$, $\nu_2$, ..., respectively represent the Abbe numbers of respective lenses.

Embodiment 1 is the lens configurations as shown FIG. 1 which comprises a positive lens unit, a negative lens unit, a positive lens unit, a stop, and an imaging lens unit. The negative lens unit and the positive lens unit in front of the stop moving from the wide position to the tele position as shown, and thus making a change of airspace between respected lens units in order to change a focal length.

Figure 7:
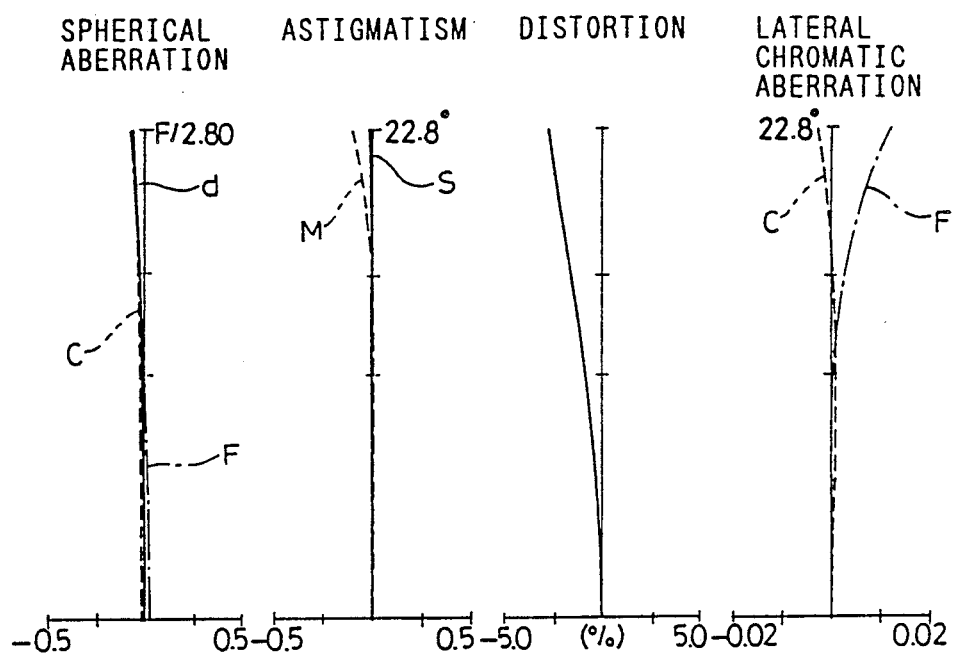
FIG. 7 through 9, respectively, show graphs illustrating aberration curves of Embodiment 1.
Figure 8:
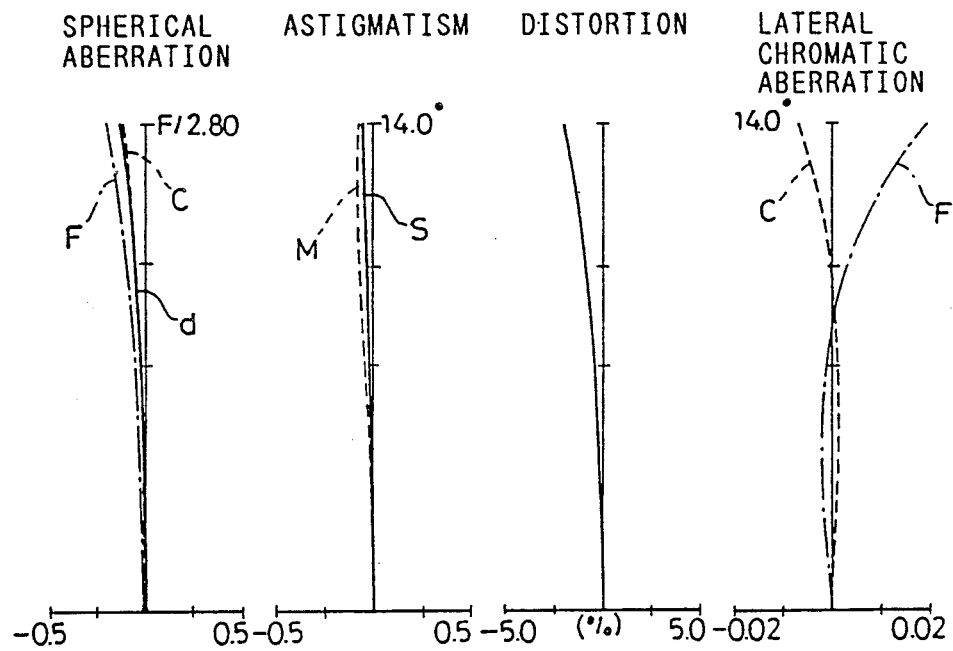
Figure 9:
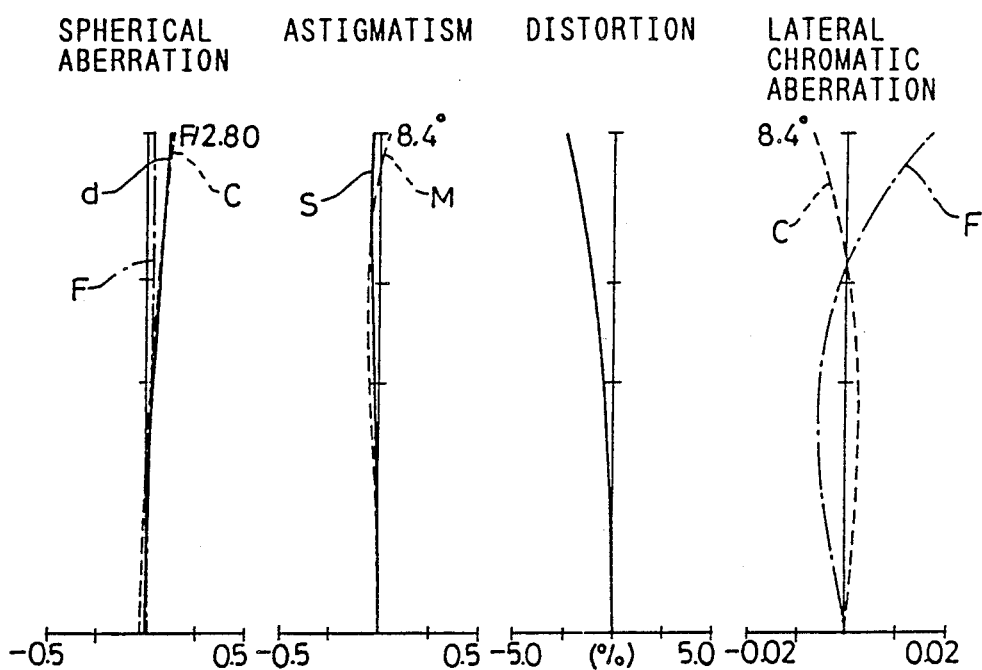

In this Embodiment, the imaging lens unit comprises only one GRIN lens. Also a GRIN lens is applied to the one closest to the object side. The conditions of aberrations at wide position, intermidiate focal length, and tele position as well are described in the FIGS. 7, 8, and 9 respectively.

Figure 10:
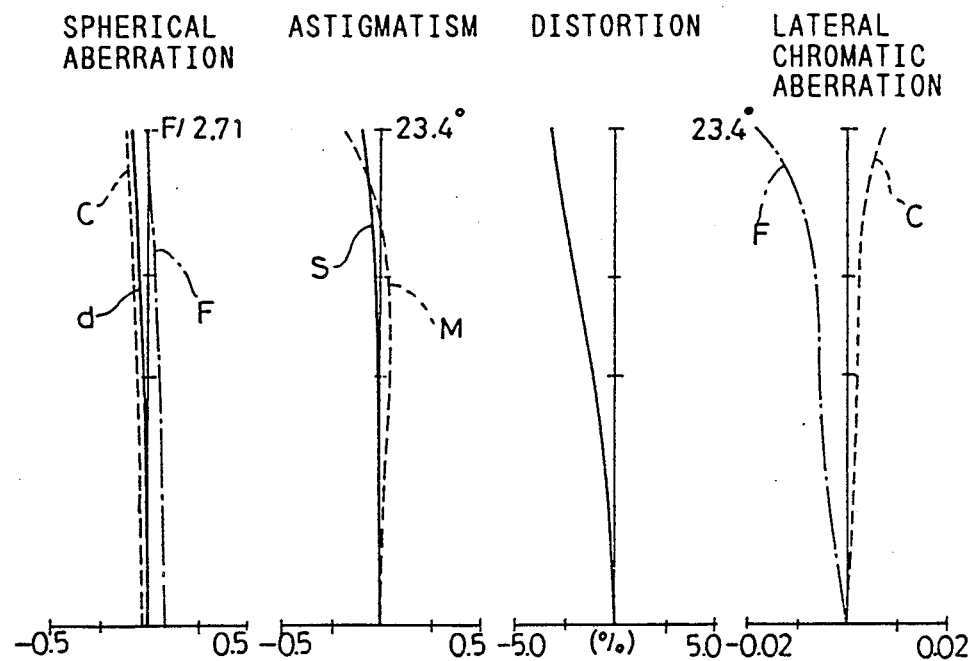
FIG. 10 through 12, respectively, show graphs illustrating aberration curves of Embodiment 2.
Figure 11:
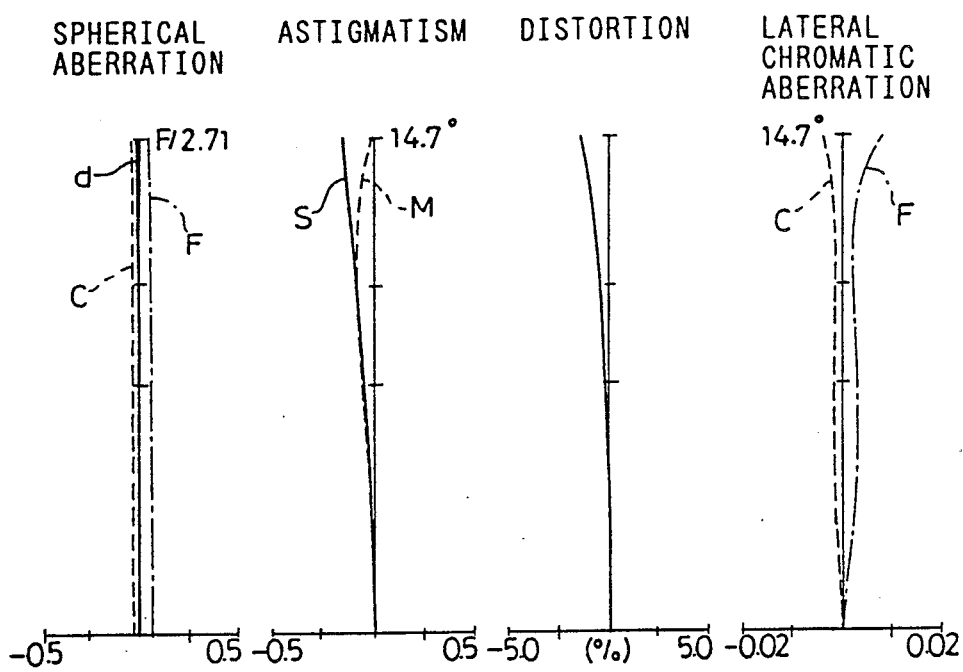
Figure 12:
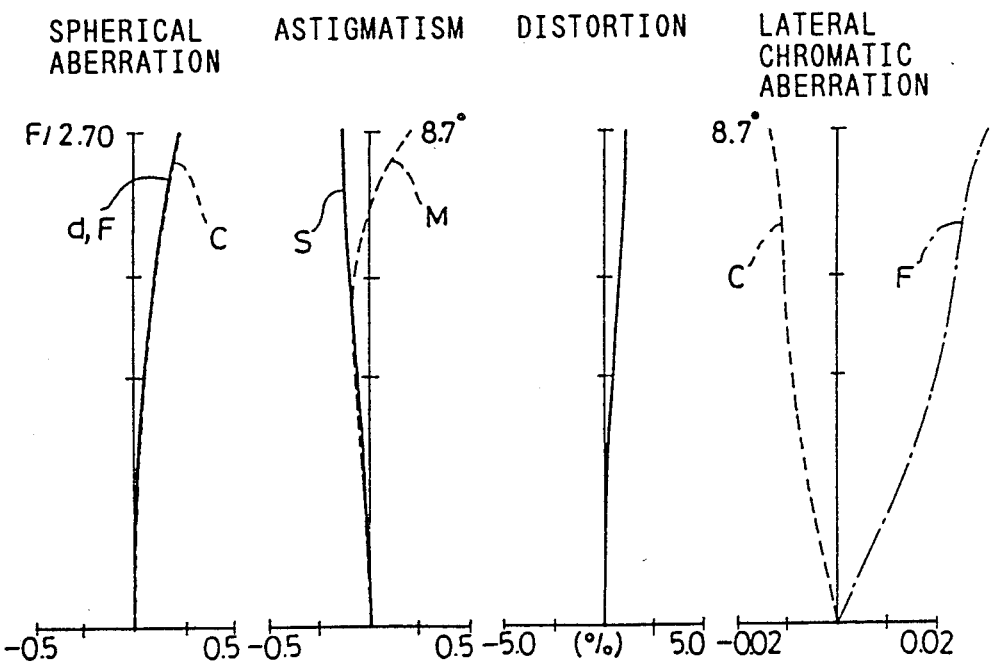

Embodiment 2, it comprises a positive lens unit, a negative lens unit, a positive lens unit, a stop, and an imaging lens unit. The imaging lens unit comprises a GRIN lens, which is the closest to the image side, and the negative lens unit is a GRIN lens. The conditions of aberrations at wide position, intermediate focal length, and tele position as well as described in the FIGS. 10, 11, and 12 respectively.

Figure 3:
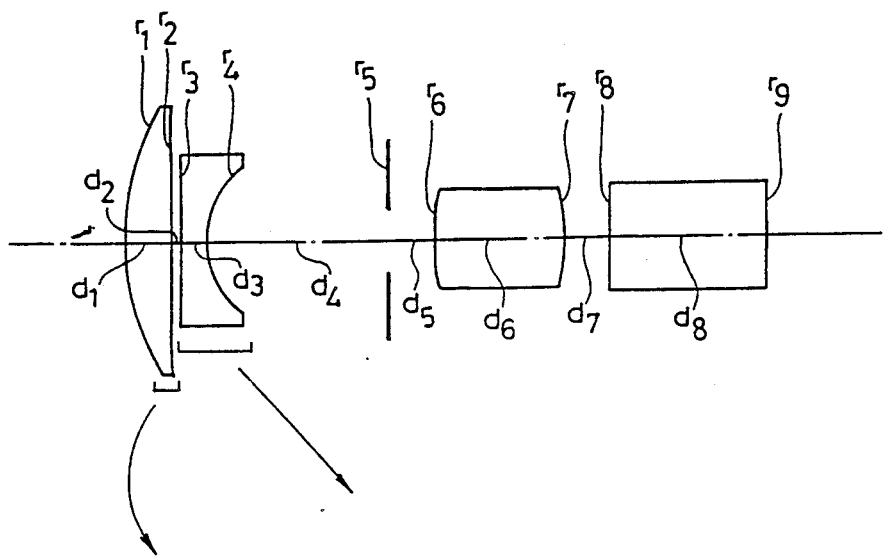

Embodiment 3 is the lens configurations as shown in the FIG. 3, which comprises a positive lens unit, a negative lens unit, a stop, and the imaging lens unit. The positive lens unit situated at the object side and the negative lens unit are moved to make a variable focal length lens.

Figure 13:
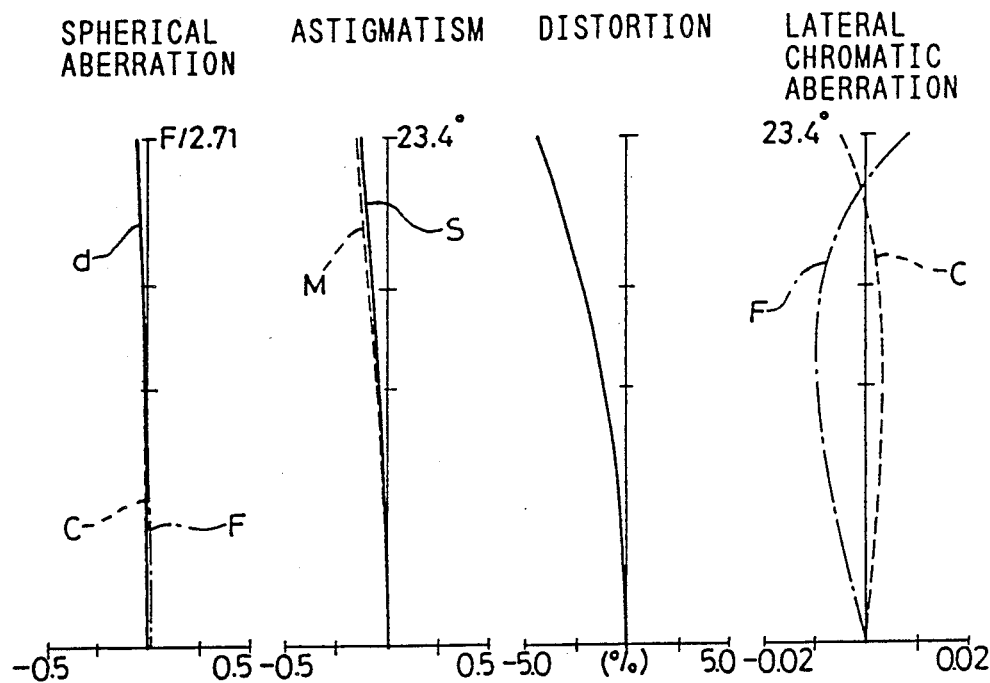
FIG. 13 through 15, respectively, show graphs illustrating aberration curves of Embodiment 3.
Figure 14:
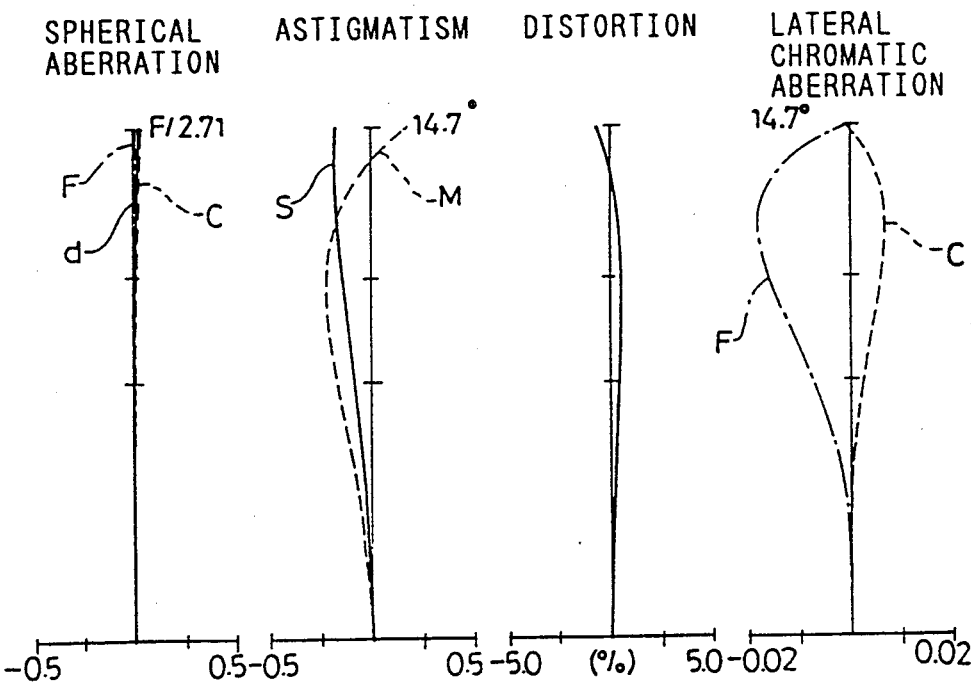
Figure 15:
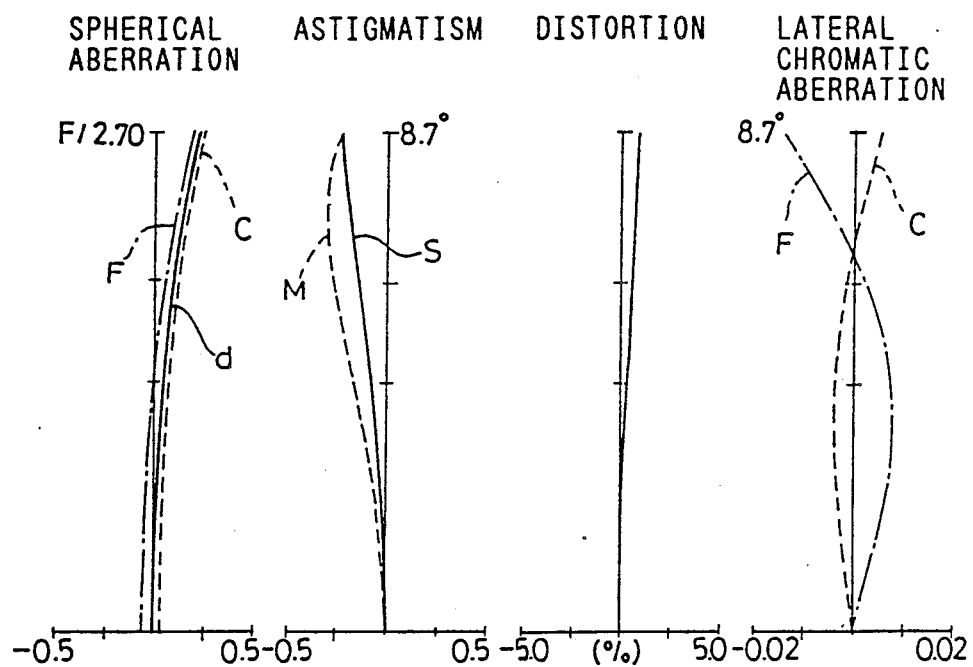

In this Embodiment as well, such an imaging lens unit comprises only one GRIN lens, and all the lens units are made of GRIN lens. The conditions of aberrations at wide position, intermediate focal length, and tele position are shown in the FIGS. 13, 14, and 15 respectively.

Figure 4:
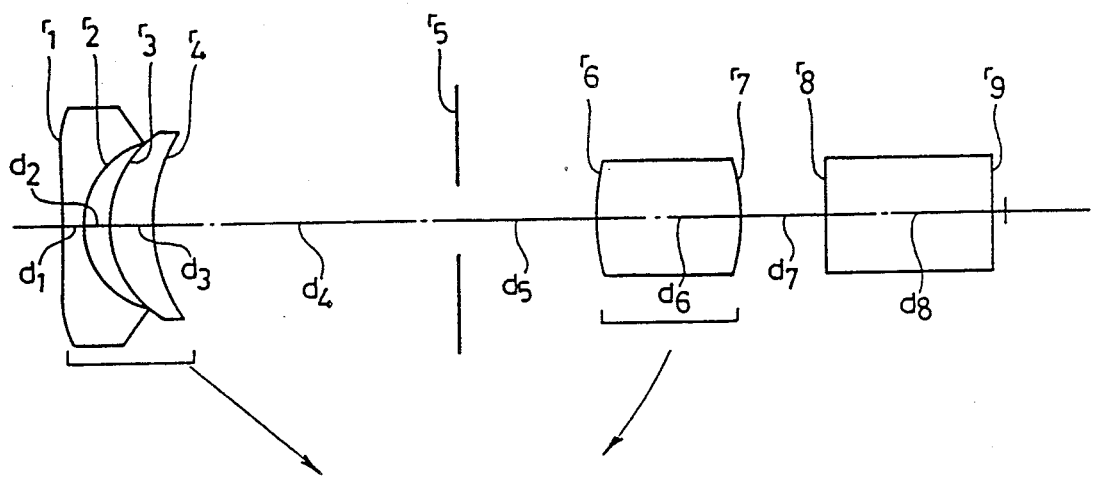
Figure 16:
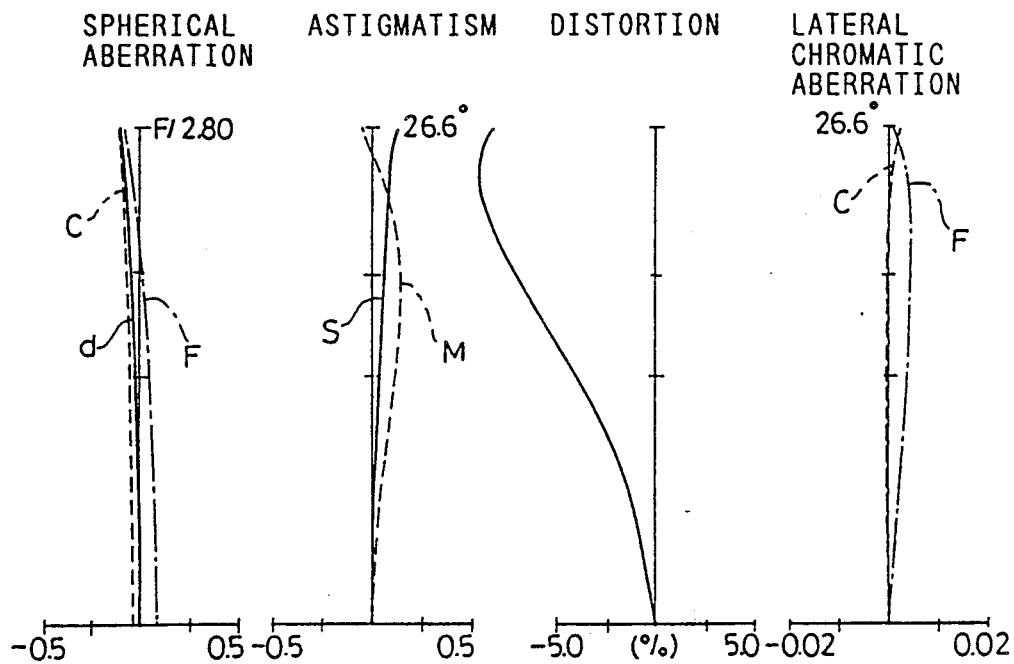
FIG. 16 through 18, respectively, show graphs illustrating aberration curves of Embodiment 4.
Figure 17:
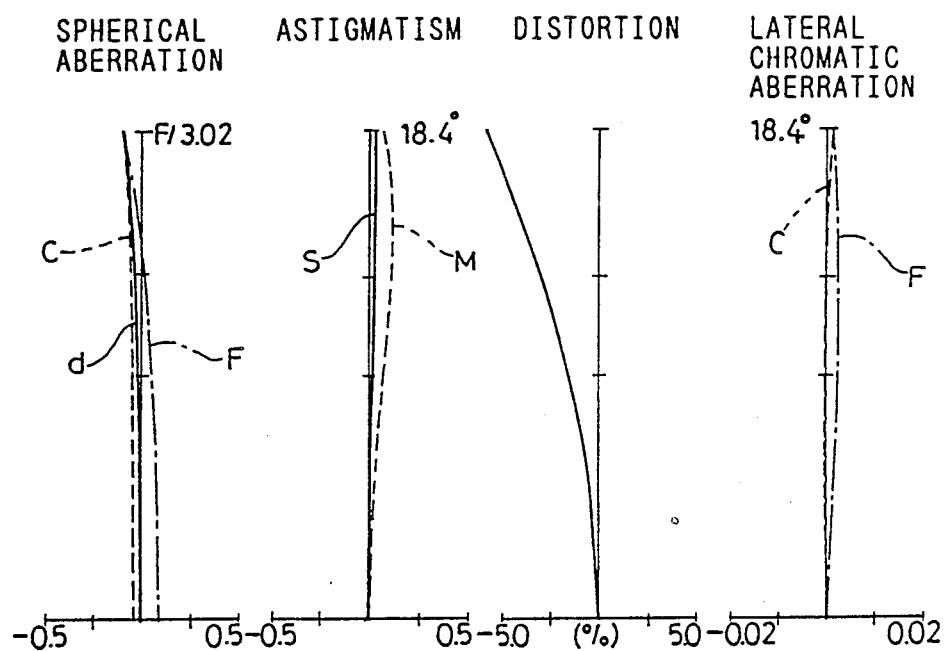
Figure 18:
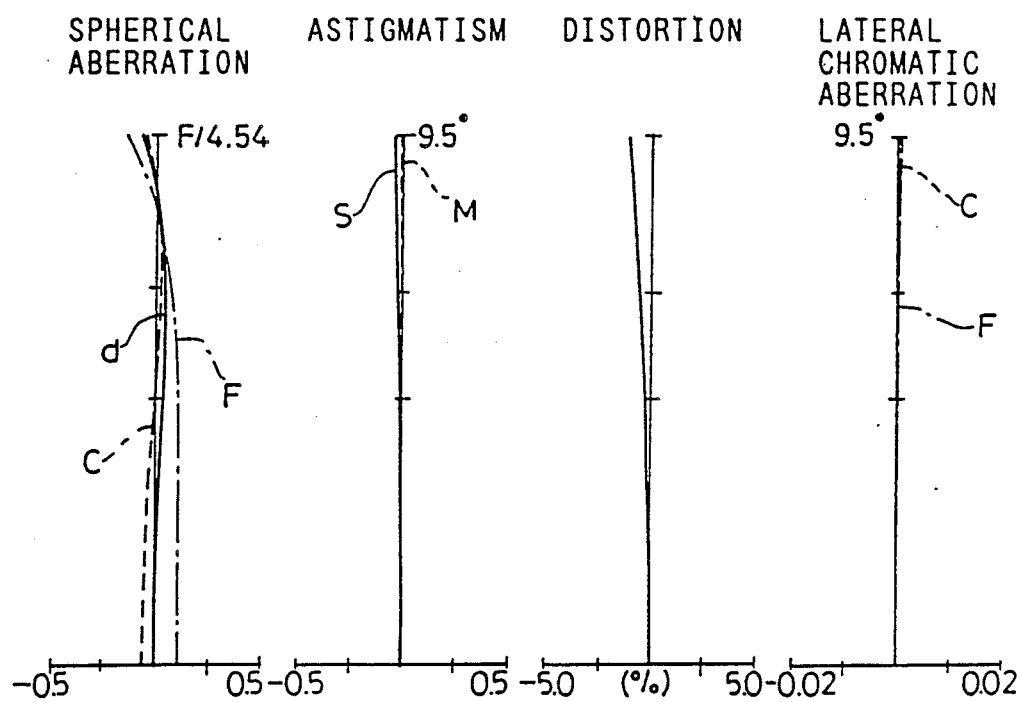

Embodiment 4 is the lens configurations as shown in the FIG. 4, and it comprises a negative lens unit, a stop, and an imaging lens unit. Changing a focal length can be done by producing a change of airspace between the above two lenses. Imaging lens unit comprises only one GRIN lens. The conditions of aberrations at wide position, intermediate focal length, and tele position are described in the FIGS. 16, 17, and 18 respectively.

Figure 5:
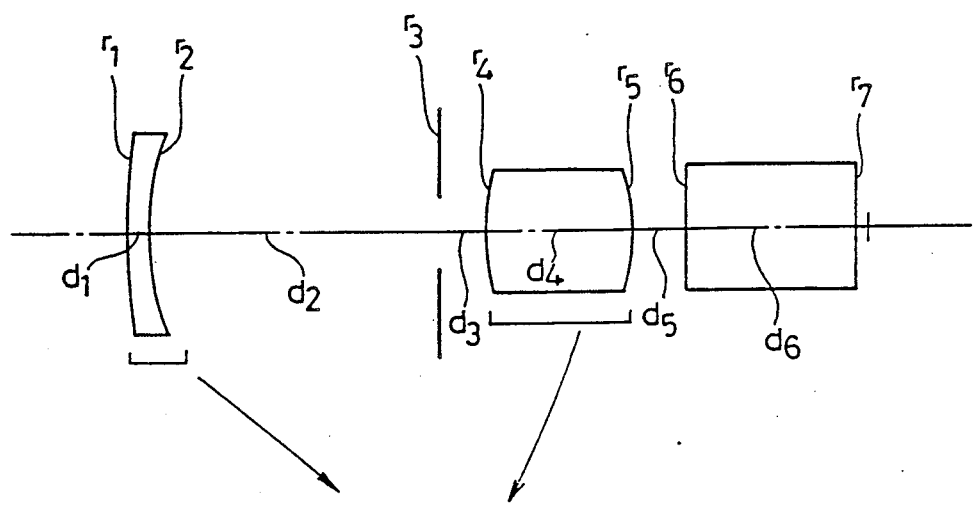
Figure 19:
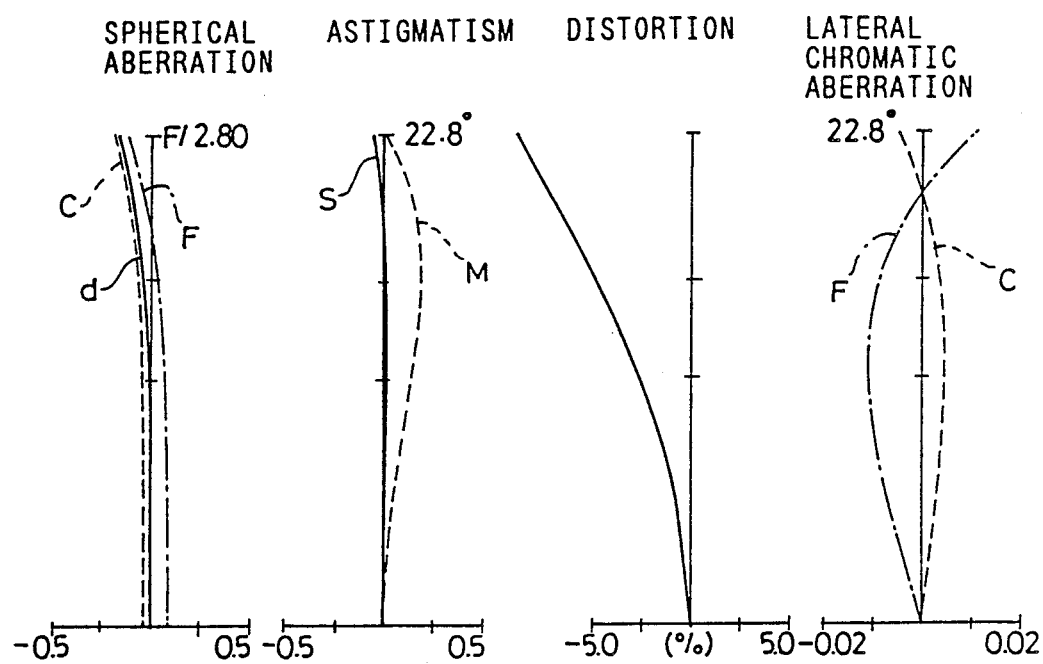
FIG. 19 through 21, respectively, show graphs illustrating aberration curves of Embodiment 5.
Figure 20:
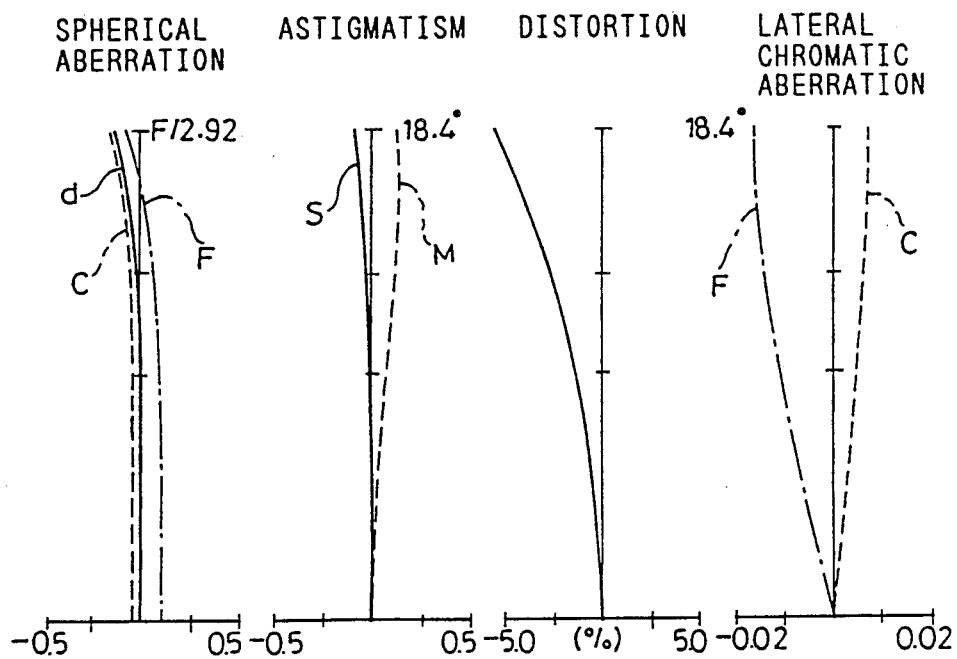
Figure 21:
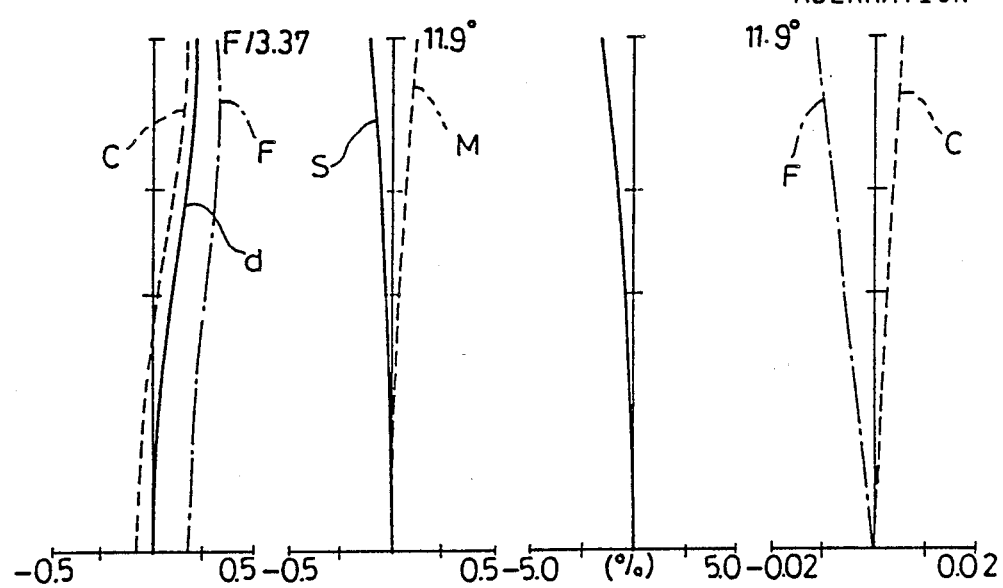

Embodiment 5 is shown as in the FIG. 5, it comprises a negative lens unit, a stop, and an imaging lens unit. A variable focal length is achieved by producing a change of airspace between the said two lenses. Both lenses are made of GRIN lens only. The conditions of aberrations of this embodiment at wide position, intermediate focal length, and tele position are shown in the FIGS. 19, 20, and 21 respectively.

Figure 6:
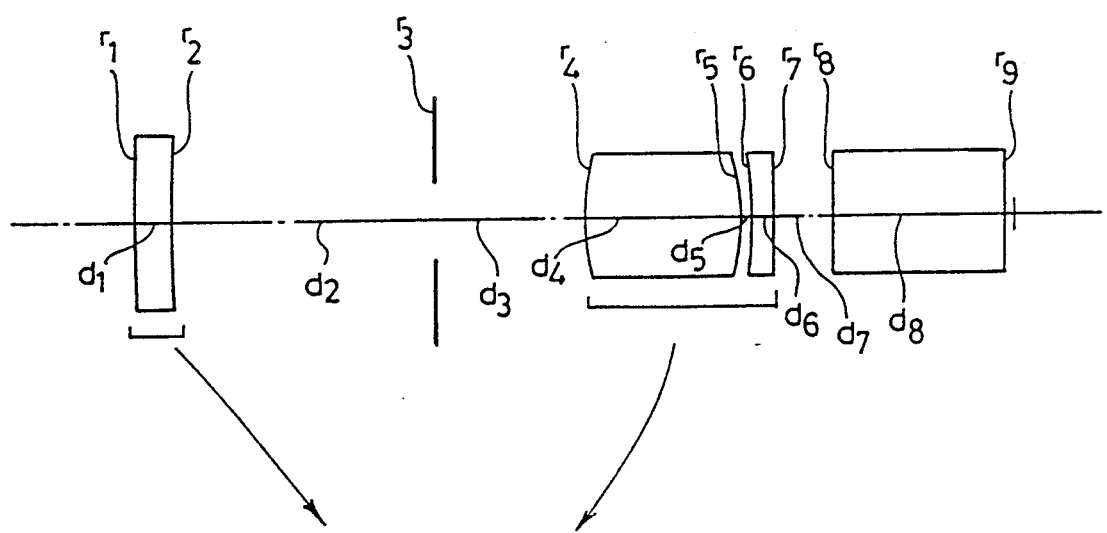
Figure 22:
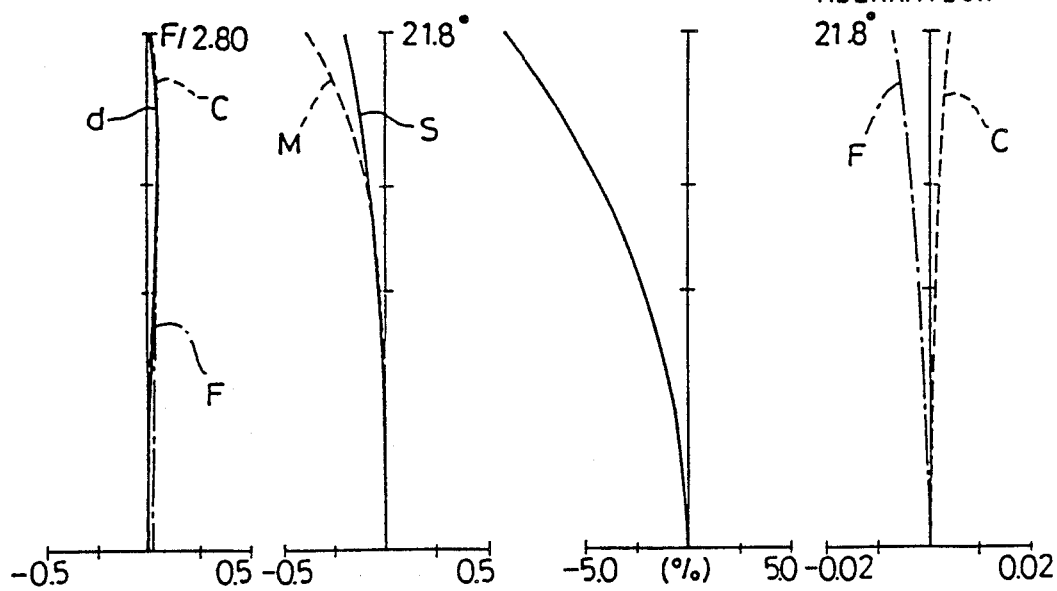
FIGS. 22 through 24, respectively, shown graphs illustrating aberration curves of Embodiment 6.
Figure 23:
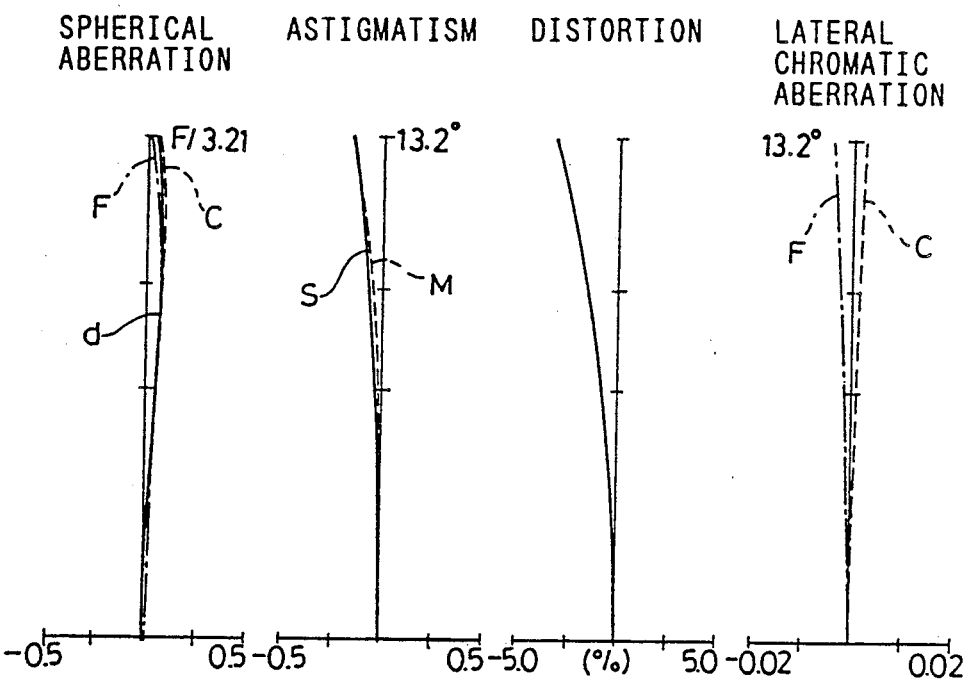
Figure 24:
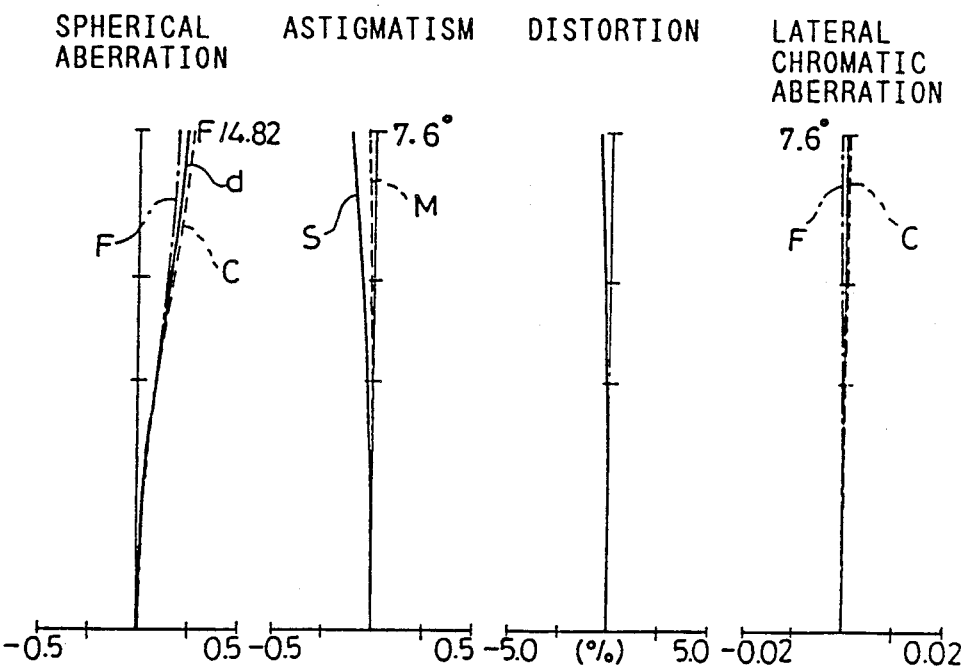

Embodiment 6 is the lens configurations as shown in the FIG. 6. It comprises a negative lens unit, a stop, and imaging lens unit, and changing a focal length is done by producing a change of airspace between said two lenses. A negative lens unit is made of only one GRIN lens and an imaging lens unit is made of one GRIN lens and another homogeneous lens. The conditions of aberrations at wide position, intermediate focal length, and tele position of this embodiment are shown in the FIGS. 22, 23, and 24 respectively.

The refractive index of the GRIN lens used in these embodiments is expressed by the following formula.

$$n(r) = n_0 + n_1 r^2 + n_2 r^4 + \ldots$$

where reference symbol $n_0$ represents the refractive index on the optical axis, reference symbol r represents the radial distance from the optical axis, and reference symbols $n_1$, $n_2$, ... represent the coefficients.

Also in the Embodiment 4 according to the present invention, an aspherical surface is used and, in its shape, the line "x" shows a direction of an optical axis and the line "y" shows a perpendicular line of an optical axis, then the following formula is obtained.

$$x = \frac{y/r^2}{1 + \sqrt{1 - p(y/r)^2}} + Ey^4 + Fy^6 + Gy^8 + \ldots$$

where reference symbol r represents the radii of curvature of the lens surface intersecting the above aspherical surface on the optical axis, and reference symbol p represents, conic constant. Reference symbols E, F, G, ... represents the aspherical coefficient.

In these embodiments, each glass block located at the image side of the imaging lens unit is made of the optical materials such as "low-pass" filter.

As explained above in detail, the present invention enables the variable focal length lens system to become simpler and more effective for processing and assembling those lenses or lens burrels with lesser number of lenses by applying a radial GRIN lens to the imaging lens unit and by arranging a stop in front of the imaging lens unit.

We claim:

1. A variable focal length lens system comprising:
a plurality of lens units separated from each other by respective airspaces; and
an aperture stop;
one lens unit being located on the most image side among said lens units, said one lens unit having positive refractive power and a function of image formation;
the focal length of said lens system being variable by changing at least one of said airspaces;
said one lens unit including a radial GRIN lens component;
said aperture stop being on the object side of said one lens unit; and
the refractive index of said GRIN lens being expressed by the formula shown below and satisfying the following conditions (2) and (3), $$n(r) = n_0 + n_1 r^2 + n_2 r^4 + \ldots$$
$$(2) \quad -2 < n_1(d) \cdot f_G^2 < 0.5$$
$$(3) \quad -0.5 < n_2(d) D f_G^3 < 2$$

where the reference symbol $n_0$ represents the refractive index of said GRIN lens on its optical axis, the reference symbol r represents the radial distance from the optical axis, the reference symbols $n_1$, $n_2$, ... being the coefficients of refractive index distribution, the reference symbols $n_1(d)$, $n_2(d)$ representing the coefficient value of $n_1$, $n_2$ corresponding to the line "d" of the GRIN lens, reference symbol D representing the thickness of said GRIN lens on its optical axis, and the reference symbol $f_G$ representing the focal length of said GRIN lens.

2. A variable focal length lens system according to claim 1 and fulfilling the following condition (4), $$0 < \nu_o - \nu_r < 30 \qquad (4)$$

where the reference symbols $\nu_o$, $\nu_r$ represent the Abbe number at the optical axis and marginal portions, respectively, of said GRIN lens.

3. A variable focal length lens system according to claim 1 and satisfying the following condition (5), $$0.4 < D/f_G < 2.5 \qquad (5)$$

where the reference symbol D represents the thickness of said GRIN lens at its optical axis and the reference symbol $f_G$ represents the focal length of said GRIN lens.

4. A variable focal length lens system according to claim 1 and which fulfills the following conditions (4) and (5).

$$0 < \nu_o - \nu_r < 30 \qquad (4)$$

$$0.4 < D/f_G < 2.5 \qquad (5)$$

where the reference symbols $\nu_o$, $\nu_r$ represents the Abbe number at the optical axis and marginal portions, respectively, of said GRIN lens, the reference symbol D represents the thickness of said GRIN lens at its optical axis and reference symbol $f_G$ represents the focal length of said GRIN lens.

5. A variable focal length lens system comprising:
a plurality of lens units separated from each other by respective airspaces; and
an aperture stop;
one lens unit being located on the most image side among said lens units, said one lens unit having positive refractive power and a function of image formation;
the focal length of said lens system being variable by changing at least one of said airspaces;
said one lens unit including a radial GRIN lens component;
said aperture stop being on the object side of said one lens unit; and
said GRIN lens fulfilling the following condition (4):

$$0 < \nu_o - \nu_r < 30 \qquad (4)$$

where the reference symbols $\nu_o$ and $\nu_r$ represent the Abbe number at the optical axis and marginal portions of said GRIN lens.

6. A variable focal length lens system comprising:
a plurality of lens units separated from each other by respective airspaces; and
an aperture stop;
one lens unit being located on the most image side among said lens units, said one lens unit having positive refractive power and a function of image formation;
the focal length of said lens system being variable by changing at least one of said airspaces;
said one lens unit including a radial GRIN lens component;
said aperture stop being on the object side of said one lens unit; and
said GRIN lens satisfying the following condition (5):

$$0.4 < D/f_G < 2.5 \qquad (5)$$

where the reference symbol D represents the thickness of said GRIN lens at its optical axis and the reference symbol $f_G$ represents the focal length of said GRIN lens.

7. A variable focal length system according to claim 6 and fulfilling the following condition (4), $$0 < \nu_o - \nu_r < 30 \qquad (4)$$

where the reference symbols $\nu_o$, $\nu_r$ represent the Abbe number at the optical axis and marginal portions, respectively, of said GRIN lens.

8. A variable focal length lens system according to claim 1, 2, 3, 2, 5, 6, or 7 wherein said positive lens unit further includes a homogeneous lens component satisfying the following condition:

$$f_G \cdot \Sigma_i |1/f_i| < 0.4 \qquad (1)$$

where the reference symbol $f_G$ represents the focal length of said GRIN lens component of said lens unit, and the reference symbol $f_i$ represent the focal length of the i-th lens of said homogeneous lens component.

9. A variable focal length one lens system according to claim 1, 2, 5, 6, or 7 wherein said one lens unit having positive refractive power and imaging function consists only of said radial GRIN lens component.

* * * * *